(12) United States Patent
Evans et al.

(10) Patent No.: US 8,739,204 B1
(45) Date of Patent: *May 27, 2014

(54) DYNAMIC LOAD BASED AD INSERTION

(75) Inventors: Gregory M. Evans, Raleigh, NC (US); Richard J. Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 370 days.

This patent is subject to a terminal disclaimer.

(21) Appl. No.: 13/270,581

(22) Filed: Oct. 11, 2011

Related U.S. Application Data

(63) Continuation of application No. 12/036,434, filed on Feb. 25, 2008, now Pat. No. 8,060,904.

(51) Int. Cl.
*H04N 7/025* (2006.01)
*H04N 7/10* (2006.01)

(52) U.S. Cl.
USPC .............. 725/32; 725/36; 725/92; 725/100; 725/115; 705/14.4; 705/14.41; 705/14.42; 705/14.43; 705/14.44; 705/14.45; 705/14.46; 705/14.47; 705/14.48; 705/14.49; 705/14.67; 705/14.68; 705/14.69; 705/14.72; 705/14.73

(58) Field of Classification Search
USPC ........... 725/39–41, 44, 47, 51, 55, 68, 89, 92, 725/100, 115, 131, 132, 134, 139, 142, 145, 725/151, 32, 36; 705/14.4–14.49, 705/14.67–14.69, 14.72–14.73
See application file for complete search history.

(56) References Cited

U.S. PATENT DOCUMENTS

| | | | |
|---|---|---|---|
| 4,814,883 A | 3/1989 | Perine et al. | |
| 5,155,591 A | 10/1992 | Wachob | |
| 5,231,494 A | 7/1993 | Wachob | |
| 5,424,770 A | 6/1995 | Schmelzer et al. | |
| 5,543,842 A | 8/1996 | Xu et al. | |

(Continued)

FOREIGN PATENT DOCUMENTS

| | | |
|---|---|---|
| EP | 0989722 A1 | 3/2000 |
| EP | 1067792 A2 | 1/2001 |

(Continued)

OTHER PUBLICATIONS

Bailey, S. et al., "The Architecture of Direct Data Placement (DDP) and Remote Direct Memory Access (RDMA) on Internet Protocols", Request for Comments (RFC) 4296, Network Working Group, Internet Engineering Task Force, Dec. 2005, http://www.ietf.org/rfc/rfc4296.txt, 21 pages.

(Continued)

*Primary Examiner* — Yassin Alata
(74) *Attorney, Agent, or Firm* — Withrow & Terranova, PLLC

(57) ABSTRACT

A system and method are provided for dynamically adjusting advertisement ("ad") time for a multicast channel. In one embodiment, a variable ad insertion function operates to receive one or more multicasts of media content from a core distribution network, insert ad timeslots into the media content, and optionally perform late-binding of ads to the ad timeslots. The media content including the inserted ad timeslots and late-binded ads, if any, is then multicast to associated client devices over a feeder network using corresponding multicast channels. For each multicast channel, insertion of ad timeslots into the associated media content is dynamically controlled based on the number of users currently consuming or predicted to consume the multicast channel, the number of client devices receiving or predicted to receive the multicast channel, or both.

20 Claims, 10 Drawing Sheets

(56) References Cited

U.S. PATENT DOCUMENTS

| | | |
|---|---|---|
| 5,652,615 A | 7/1997 | Bryant et al. |
| 5,794,210 A | 8/1998 | Goldhaber et al. |
| 5,959,623 A | 9/1999 | van Hoff et al. |
| 5,974,398 A | 10/1999 | Hanson et al. |
| 6,065,050 A | 5/2000 | DeMoney |
| 6,128,651 A | 10/2000 | Cezar |
| 6,161,127 A | 12/2000 | Cezar et al. |
| 6,204,887 B1 | 3/2001 | Hiroi |
| 6,219,837 B1 | 4/2001 | Yeo et al. |
| 6,496,857 B1 | 12/2002 | Dustin et al. |
| 6,574,793 B1 | 6/2003 | Ngo et al. |
| 6,584,492 B1 | 6/2003 | Cezar et al. |
| 6,633,608 B1 | 10/2003 | Miller |
| 6,637,032 B1 | 10/2003 | Feinleib |
| 6,651,089 B1 | 11/2003 | Stead |
| 6,697,878 B1 | 2/2004 | Imai |
| 6,698,020 B1 | 2/2004 | Zigmond et al. |
| 6,718,551 B1 | 4/2004 | Swix et al. |
| 6,727,958 B1 | 4/2004 | Shyu |
| 6,738,978 B1 | 5/2004 | Hendricks et al. |
| 6,769,130 B1 | 7/2004 | Getsin et al. |
| 6,799,326 B2 | 9/2004 | Boylan, III et al. |
| 6,820,277 B1 | 11/2004 | Eldering et al. |
| 6,938,268 B1 | 8/2005 | Hodge |
| 6,968,012 B1 | 11/2005 | Meggers |
| 6,983,478 B1 | 1/2006 | Grauch et al. |
| 7,020,892 B2 | 3/2006 | Levesque et al. |
| 7,039,932 B2 | 5/2006 | Eldering |
| 7,076,530 B2 | 7/2006 | Betz et al. |
| 7,096,487 B1 | 8/2006 | Gordon et al. |
| 7,100,183 B2 | 8/2006 | Kunkel et al. |
| 7,134,132 B1 | 11/2006 | Ngo et al. |
| 7,146,627 B1 | 12/2006 | Ismail et al. |
| 7,155,210 B2 | 12/2006 | Benson |
| 7,184,433 B1 | 2/2007 | Oz |
| 7,185,353 B2 | 2/2007 | Schlack |
| 7,209,874 B2 | 4/2007 | Salmonsen |
| 7,228,555 B2 | 6/2007 | Schlack |
| 7,245,614 B1 | 7/2007 | Podar et al. |
| 7,281,030 B1 | 10/2007 | Davis |
| 7,328,450 B2 | 2/2008 | Macrae et al. |
| 7,363,643 B2 | 4/2008 | Drake et al. |
| 7,451,467 B2 | 11/2008 | Carver et al. |
| 7,565,450 B2 | 7/2009 | Garcia-Luna-Aceves et al. |
| 7,571,440 B2 | 8/2009 | Vessey et al. |
| 7,600,037 B2 | 10/2009 | Tucker |
| 7,650,617 B2 | 1/2010 | Hoshino et al. |
| 7,652,594 B2 | 1/2010 | Lamont et al. |
| 7,730,509 B2 | 6/2010 | Boulet et al. |
| 7,743,112 B2 | 6/2010 | Kenna, III et al. |
| 7,783,773 B2 | 8/2010 | Wu et al. |
| 7,882,531 B2 | 2/2011 | Yamagishi |
| 7,996,482 B1 | 8/2011 | Evans et al. |
| 8,060,904 B1 | 11/2011 | Evans et al. |
| 8,290,873 B2 | 10/2012 | Issa et al. |
| 2001/0034763 A1 | 10/2001 | Jacobs et al. |
| 2002/0007413 A1 | 1/2002 | Garcia-Luna-Aceves et al. |
| 2002/0019769 A1 | 2/2002 | Barritz et al. |
| 2002/0023165 A1 | 2/2002 | Lahr |
| 2002/0072966 A1 | 6/2002 | Eldering et al. |
| 2002/0078444 A1 | 6/2002 | Krewin et al. |
| 2002/0083439 A1 | 6/2002 | Eldering |
| 2002/0087402 A1 | 7/2002 | Zustak et al. |
| 2002/0087978 A1 | 7/2002 | Nicholson et al. |
| 2002/0095454 A1 | 7/2002 | Reed et al. |
| 2002/0099606 A1 | 7/2002 | Shlagman |
| 2002/0124249 A1 | 9/2002 | Shintani et al. |
| 2002/0124251 A1 | 9/2002 | Hunter et al. |
| 2002/0129368 A1 | 9/2002 | Schlack et al. |
| 2002/0138291 A1 | 9/2002 | Vaidyanathan et al. |
| 2002/0138440 A1 | 9/2002 | Vaidyanathan et al. |
| 2002/0138831 A1 | 9/2002 | Wachtfogel et al. |
| 2002/0144263 A1 | 10/2002 | Eldering et al. |
| 2002/0161838 A1 | 10/2002 | Pickover et al. |
| 2002/0178445 A1 | 11/2002 | Eldering et al. |
| 2002/0184047 A1 | 12/2002 | Plotnick et al. |
| 2002/0184403 A1 | 12/2002 | Dahlin et al. |
| 2003/0004793 A1 | 1/2003 | Feuer et al. |
| 2003/0009432 A1 | 1/2003 | Sugahara et al. |
| 2003/0028888 A1 | 2/2003 | Hunter et al. |
| 2003/0036974 A1 | 2/2003 | Allen |
| 2003/0061607 A1 | 3/2003 | Hunter et al. |
| 2003/0065804 A1 | 4/2003 | Owerfeldt et al. |
| 2003/0093790 A1 | 5/2003 | Logan et al. |
| 2003/0114146 A1 | 6/2003 | Benson |
| 2003/0145323 A1 | 7/2003 | Hendricks et al. |
| 2003/0149975 A1 | 8/2003 | Eldering et al. |
| 2003/0165196 A1 | 9/2003 | Demas et al. |
| 2003/0196211 A1 | 10/2003 | Chan |
| 2004/0003398 A1 | 1/2004 | Donian et al. |
| 2004/0032881 A1 | 2/2004 | Arai |
| 2004/0034863 A1 | 2/2004 | Barrett et al. |
| 2004/0049600 A1 | 3/2004 | Boyd et al. |
| 2004/0111742 A1 | 6/2004 | Hendricks et al. |
| 2004/0128317 A1 | 7/2004 | Sull et al. |
| 2004/0148625 A1 | 7/2004 | Eldering et al. |
| 2004/0163101 A1 | 8/2004 | Swix et al. |
| 2004/0210896 A1 | 10/2004 | Chou et al. |
| 2004/0225719 A1 | 11/2004 | Kisley et al. |
| 2004/0248601 A1 | 12/2004 | Chang |
| 2004/0267880 A1 | 12/2004 | Patiejunas |
| 2005/0036555 A1 | 2/2005 | Ramakrishnan |
| 2005/0039205 A1 | 2/2005 | Riedl |
| 2005/0084009 A1 | 4/2005 | Furukawa et al. |
| 2005/0091160 A1 | 4/2005 | Kitze et al. |
| 2005/0097183 A1 | 5/2005 | Westrelin |
| 2005/0097599 A1 | 5/2005 | Plotnick et al. |
| 2005/0108776 A1 | 5/2005 | Carver et al. |
| 2005/0114885 A1 | 5/2005 | Shikata et al. |
| 2005/0152394 A1 | 7/2005 | Cho |
| 2005/0160470 A1 | 7/2005 | Strauss |
| 2005/0193425 A1 | 9/2005 | Sull et al. |
| 2005/0204387 A1 | 9/2005 | Knudson et al. |
| 2005/0232304 A1 | 10/2005 | Quigley |
| 2005/0240967 A1 | 10/2005 | Anderson et al. |
| 2005/0251820 A1 | 11/2005 | Stefanik et al. |
| 2005/0259947 A1 | 11/2005 | Wang et al. |
| 2005/0283796 A1 | 12/2005 | Flickinger |
| 2005/0289588 A1 | 12/2005 | Kinnear |
| 2006/0036490 A1 | 2/2006 | Sagalyn |
| 2006/0059042 A1* | 3/2006 | Zohar ............................ 705/14 |
| 2006/0059048 A1 | 3/2006 | Frentzel-Beyme et al. |
| 2006/0075057 A1 | 4/2006 | Gildea et al. |
| 2006/0095507 A1 | 5/2006 | Watson |
| 2006/0107302 A1 | 5/2006 | Zdepski |
| 2006/0110552 A1 | 5/2006 | Ishida et al. |
| 2006/0123443 A1 | 6/2006 | Hamilton et al. |
| 2006/0168616 A1 | 7/2006 | Candelore |
| 2006/0174312 A1 | 8/2006 | Ducheneaut et al. |
| 2006/0174313 A1 | 8/2006 | Ducheneaut et al. |
| 2006/0212900 A1 | 9/2006 | Ismail et al. |
| 2006/0224761 A1 | 10/2006 | Howarth et al. |
| 2006/0230119 A1 | 10/2006 | Hausauer et al. |
| 2006/0262799 A1 | 11/2006 | Biran et al. |
| 2006/0270395 A1 | 11/2006 | Dhawan et al. |
| 2006/0294555 A1 | 12/2006 | Xie |
| 2007/0003223 A1 | 1/2007 | Armstrong et al. |
| 2007/0011702 A1 | 1/2007 | Vaysman |
| 2007/0015531 A1 | 1/2007 | Disalvo |
| 2007/0027754 A1 | 2/2007 | Collins et al. |
| 2007/0027755 A1 | 2/2007 | Lee |
| 2007/0028261 A1 | 2/2007 | Bouilloux-Lafont |
| 2007/0058670 A1 | 3/2007 | Konduru et al. |
| 2007/0065122 A1 | 3/2007 | Chatterton |
| 2007/0089127 A1 | 4/2007 | Flickinger et al. |
| 2007/0100690 A1 | 5/2007 | Hopkins |
| 2007/0107026 A1 | 5/2007 | Sherer et al. |
| 2007/0112971 A1 | 5/2007 | Noff et al. |
| 2007/0192789 A1 | 8/2007 | Medford |
| 2007/0198660 A1 | 8/2007 | Cohen |
| 2007/0204115 A1 | 8/2007 | Abramson |
| 2007/0214480 A1 | 9/2007 | Kamen |
| 2007/0244750 A1 | 10/2007 | Grannan et al. |
| 2007/0265974 A1 | 11/2007 | Chang |

(56) References Cited

U.S. PATENT DOCUMENTS

| | | | |
|---|---|---|---|
| 2008/0005347 | A1 | 1/2008 | Ott |
| 2008/0080568 | A1 | 4/2008 | Hughes et al. |
| 2008/0127245 | A1* | 5/2008 | Olds ............................ 725/32 |
| 2008/0186972 | A1 | 8/2008 | Guo |
| 2008/0189412 | A1 | 8/2008 | Wang et al. |
| 2008/0288556 | A1 | 11/2008 | O'Krafka et al. |
| 2008/0301311 | A1 | 12/2008 | Bestler |
| 2009/0049469 | A1 | 2/2009 | Small et al. |
| 2009/0058393 | A1 | 3/2009 | Huang |
| 2009/0077598 | A1 | 3/2009 | Watson et al. |
| 2009/0133053 | A1 | 5/2009 | Badt, Jr. et al. |
| 2011/0314083 | A1 | 12/2011 | Huotari et al. |
| 2012/0131110 | A1 | 5/2012 | Buyukkoc et al. |

FOREIGN PATENT DOCUMENTS

| | | | |
|---|---|---|---|
| EP | 1071287 | A2 | 1/2001 |
| EP | 1162840 | A2 | 12/2001 |
| EP | 1418514 | A1 | 5/2004 |
| EP | 1524602 | A2 | 4/2005 |
| EP | 1528478 | A1 | 5/2005 |
| EP | 2043323 | A1 | 4/2009 |
| WO | 9831149 | A1 | 7/1998 |
| WO | 9905584 | A2 | 2/1999 |
| WO | 9952285 | A1 | 10/1999 |
| WO | 0014951 | A1 | 3/2000 |
| WO | 0064165 | A1 | 10/2000 |
| WO | 0147156 | A2 | 6/2001 |
| WO | 0171524 | A1 | 9/2001 |
| WO | 0213112 | A1 | 2/2002 |
| WO | 0219581 | A1 | 3/2002 |
| WO | 0245430 | A2 | 6/2002 |
| WO | 02054754 | A2 | 7/2002 |
| WO | 03053056 | A1 | 6/2003 |
| WO | 2004003879 | A2 | 1/2004 |
| WO | 2004049226 | A1 | 6/2004 |
| WO | 2004080073 | A2 | 9/2004 |
| WO | 2005051020 | A1 | 6/2005 |
| WO | 2005065190 | A2 | 7/2005 |

OTHER PUBLICATIONS

Cain, B. et al., "Internet Group Management Protocol, Version 3", Request for Comments (RFC) 3376, Network Working Group, Internet Engineering Task Force, Oct. 2002, http://www.ietf.org/rfc/rfc3376.txt, 50 pages.

Deering, S. et al., "Internet Protocol, Version 6 (IPv6) Specification", Request for Comments (RFC) 2460, Network Working Group, Internet Engineering Task Force, Dec. 1998, http://www.ietf.org/rfc/rfc2460.txt, 37 pages.

Feng, M. et al., "When DRM Meets Restricted Multicast: A Content Encryption Key Scheme for Multicast Encryption and DRM," Consumer Communications and Networking Conference 2007, 4th IEEE, presented Jan. 11-13, 2007, pp. 1048-1052.

Final Office Action for U.S. Appl. No. 12/036,434 mailed Mar. 2, 2011, 15 pages.

Gwertzman, J. et al., "An Analysis of Geographical Push-Caching," World Wide Web Research, Mar. 18, 1997, http://www.eecs.harvard.edu/~vino/web/, 20 pages.

Hilland, J. et al., "RDMA Protocol Verbs Specification (Version 1.0)", Apr. 2003, http://www.rdmaconsortium.org/home/draft-hilland-iwarp-verbs-v1.0-RDMAC.pdf, 242 pages.

No Author, "Screen Plays Information Marketplace," http://www.screenplaysmag.com, accessed Feb. 4, 2009, 1 page.

International Search Report and Written Opinion mailed Aug. 20, 2008, for PCT/US08/66010, 11 pages.

International Preliminary Report on Patentability for PCT/US2008/066010 mailed Dec. 23, 2009, 7 pages.

International Search Report and Written Opinion mailed Sep. 4, 2008, for PCT/US08/66245, 11 pages.

International Preliminary Report on Patentability for PCT/US20081066245 mailed Dec. 30, 2009, 7 pages.

Kennedy, T., "Cable-Style IPTV," Nov. 1, 2007, http://www.cable360.net/print/technology/emergingtech/26400.html, 4 pages.

Margounakis, D. et al., "SEAM: A Sound-Embedded Advertisement Model for Online Digital Music Distribution," Second International Conference on Automated Production of Cross Media Content for Multi-Channel Distribution, AXMEDIS'06, presented Dec. 13-15, 2006, pp. 273-282.

Eagles, M. et al., "The Cost of Fair Bandwidth: Business Case on the Rise of Online Video, P2P, and Over-the-Top; Proactive Steps Operators Can Take Today to Meet Bandwidth Demands in the Near Future," (article), date unknown, 14 pages.

No Author, "Advertisement Bidding System and Method", ip.com Prior Art Database, Jul. 24, 2006, copyright 2004, http://www.priorartdatabase.com/IPCOM/000138556, accessed Jun. 15, 2007, 20 pages.

Non-final Office Action for U.S. Appl. No. 12/036,434 mailed Aug. 30, 2010, 12 pages.

Notice of Allowance and Fees Due for U.S. Appl. No. 12/036,434 mailed Aug. 22, 2011, 7 pages.

Pinkerton, J., "The Case for RDMA," PowerPoint presentation, RDMA Consortium, May 29, 2002, http://www.rdmaconsortium.org/home/The_Case_for_RDMA020531.pdf, 27 pages.

Postel, J., "Internet Protocol: DARPA Internet Program Protocol Specification", Request for Comments (RFC) 791, Information Sciences Institute, Sep. 1981, http://www.ietf.org/rfc/rfc791.txt, 49 pages.

Postel, J., "User Datagram Protocol", Request for Comments (RFC) 768, Aug. 28, 1980, http://www.ietf.org/rfc/rfc768.txt, 3 pages.

Recio, R. et al., "A Remote Direct Memory Access Protocol Specification," Internet Draft, Internet Engineering Task Force (IETF) Remote Direct Data Placement Work Group, Sep. 8, 2006, http://www.ietf.org/internet-drafts/draft-ietf-rddp-rdmap-07.txt, 82 pages.

Recio, R. et al., "An RDMA Protocol Specification (Version 1.0)", Oct. 2002, http://www.rdmaconsortium.org/home/draft-recio-iwarp-rdmap-v1.0.pdf, 60 pages.

Broderson, R., "InfoPad an Experiment in System Level Design and Integration," Dept. of EECS University of California, Berkeley, Proceedings of the 34th Annual Conference on Design Automation, presented Jun. 9-13, 1997, 2 pages.

Romanow, A. et al., "Remote Direct Memory Access (RDMA) over IP Problem Statement", Request for Comments (RFC) 4297, Network Working Group, Internet Engineering Task Force, Dec. 2005, http://www.ietf.org/rfc/rfc4297.txt, 19 pages.

Rovira, L., "Switched Digital Video," (article), Feb. 1, 2006, http://www.cable360.net/print/ct/strategy/emergingtech/14909.html, 7 pages.

Schulzrinne, H. et al., "Real Time Streaming Protocol (RTSP)", Request for Comments (RFC) 2326, Network Working Group, Internet Engineering Task Force, Apr. 1998, http://www.ietf.org/rfc/rfc2326.txt, 86 pages.

Schulzrinne, H., et al., "RTP: A Transport Protocol for Real-Time Applications", Request for Comments (RFC) 3550, Network Working Group, Internet Engineering Task Force, Jul. 2003, http://www.ietf.org/rfc/rfc3550.txt, 98 pages.

Shah, H. et al., "Direct Data Placement over Reliable Transports (Version 1.0)", Oct. 2002, http://www.rdmaconsortium.org/home/draft-shah-iwarp-ddp-v1.0.pdf, 35 pages.

Strickland, J., "How Switched Digital Video Works," HowStuffWorks.com, Nov. 20, 2007, http://electronics.howstuffworks.com/switched-digital-video.htm/printable, accessed Aug. 21, 2008, 4 pages.

Supplemental Notice of Allowability for U.S. Appl. No. 12/036,434 mailed Oct. 3, 2011, 4 pages.

Truman, T. et al., "The InfoPad Multimedia Terminal: A Portable Device for Wireless Information Access," Transactions on Computers, vol. 47, Issue 10, Oct. 1998, pp. 1073-1087, Abstract only, http://csdl2.computer.org/persagen/DLAbsToc.jsp?resourcePath=/dl/trans/tc/&toc=comp/trans/tc/1998/10/txtoc.xml&DOI=10.1109/12.729791.

Unknown, "Internet Cache Protocol—Wikipedia, the free encyclopedia," Wikipedia, http://en.wikipedia.org/wiki/Internet_Cache_Protocol, accessed on Jun. 15, 2007, 2 pages.

(56) References Cited

OTHER PUBLICATIONS

Unknown, "ITU Publications: Welcome," International Telecommunications Union, http://www.itu.int/publications/, accessed on Jun. 26, 2008, 1 page.

Unknown, "PacketCable TM 2.0: Codec and Media Specification, PKT-AP-CODEC-MEDIA-I02-061013", CableLabs, Oct. 13, 2006, http://www.packetcable.com/downloads/specs/PKT-SP-CODEC-MEDIA-I02-061013.pdf, 89 pages.

Unknown, "SnapStream: PC DVR and TV tuner software", SnapStream Media, http://www.snapstream.com, accessed on Jun. 15, 2007, 1 page.

Unknown, "Squid cache—Wikipedia, the free encyclopedia," Wikipedia, http://en.wikipedia.org/wiki/Squid_cache, accessed on Jun. 15, 2007, 3 pages.

Wenger, S. et al., "RTP Payload Format for H.264 Video", Request for Comments (RFC) 3984, Network Working Group, Internet Engineering Task Force, Feb. 2005, http://www.ietf.org/rfc/rfc3984.txt, 65 pages.

No Author, "Hybrid fibre-coaxial—Wikipedia, the free encylopedia", Wikipedia, http://en.wikipedia.org/w/index.php?title=Hybrid_fibre-coaxial&printable=yes1, accessed on Aug. 21, 2008, 3 pages.

Examination Report for European Patent Application No. 08770254.4, mailed Feb. 5, 2014, 6 pages.

Examination Report for European Patent Application No. 08770442.5, mailed Feb. 5, 2014, 7 pages.

* cited by examiner

DYNAMIC LOAD BASED AD INSERTION

RELATED APPLICATIONS

This application is a Continuation of co-pending U.S. patent application Ser. No. 12/036,434, entitled "Dynamic Load Based Ad Insertion," which was filed on Feb. 25, 2008, and is hereby incorporated herein by reference in its entirety.

FIELD OF THE INVENTION

The present invention relates to dynamically controlling ad time in media content provided over a multicast channel.

BACKGROUND OF THE INVENTION

As Cable Television (CATV) systems switch from primarily broadcast content to subscriber, or user, initiated Internet Protocol Television (IPTV), new techniques are needed to improve load balancing on the tree and branch architecture of Hybrid Fiber Coax (HFC) feeder networks. More specifically, IPTV, and more specifically Video on Demand (VoD), typically demand a dedicated data pipe (i.e., a unicast circuit) from a source of the content to the subscriber. As more subscribers request dedicated data pipes, the bandwidth of the HFC feeder networks may be quickly consumed. One potential solution for alleviating this issue is to utilize multicast channels to deliver content in a broadcast, rather than unicast, fashion. However, there is a need for a system and method for attracting users to such multicast channels.

SUMMARY OF THE INVENTION

The present invention provides a system and method for dynamically adjusting advertisement ("ad") time for a multicast channel based on a number of users currently consuming or predicted to consume the multicast channel, a number of client devices receiving or predicted to receive the multicast channel, or both. In one embodiment, a variable ad insertion function operates to receive one or more multicasts of media content from a core distribution network, insert ad timeslots into the media content, and optionally perform late-binding of ads to the ad timeslots. The media content including the inserted ad timeslots and late-binded ads, if any, is then multicast to associated client devices over a feeder network using corresponding multicast channels. For each multicast channel, insertion of ad timeslots into the associated media content is dynamically controlled based on the number of users currently consuming or predicted to consume the multicast channel, the number of client devices receiving or predicted to receive the multicast channel, or both.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 2:
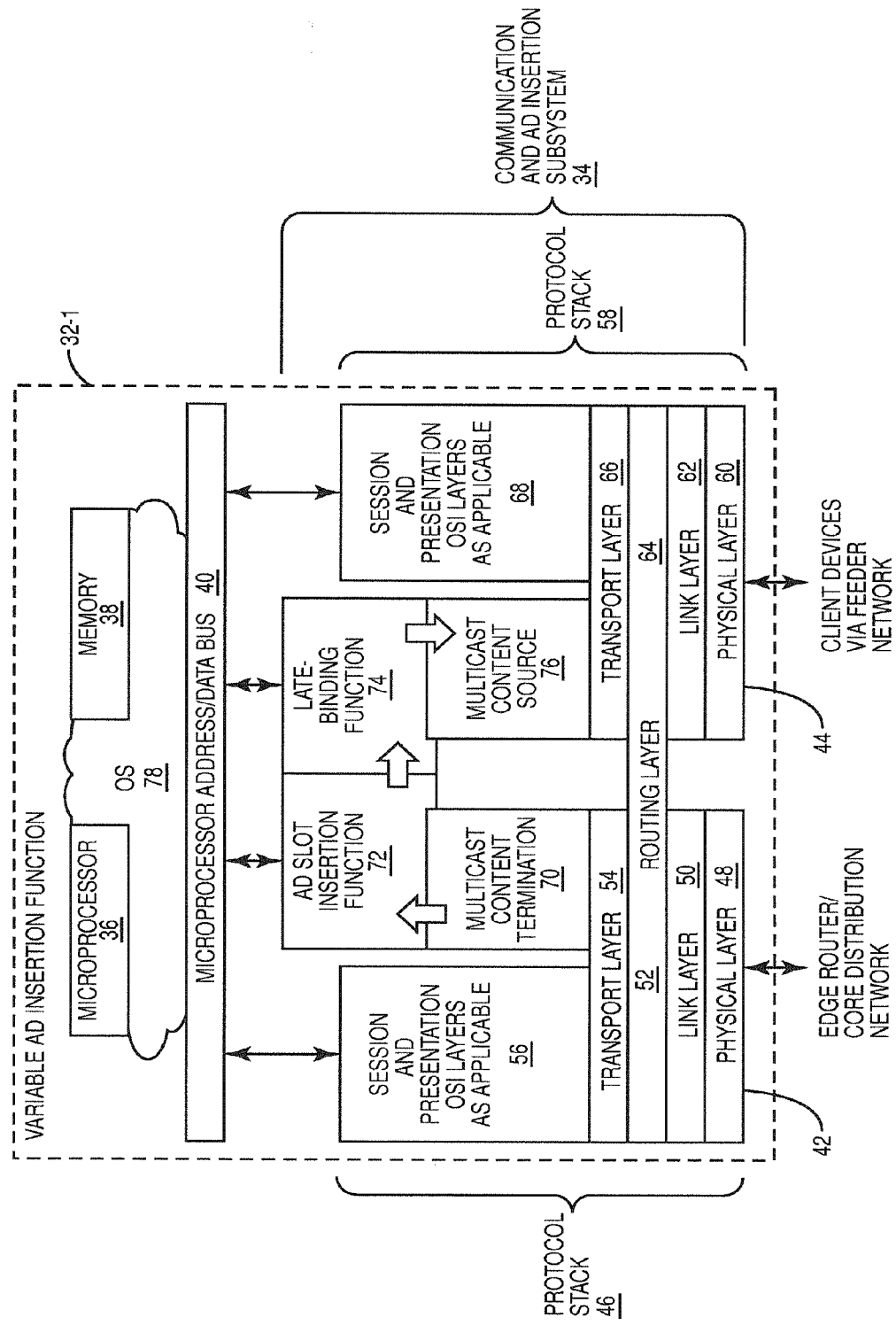
FIG. 2 is a block diagram of one of the variable ad insertion functions of FIG. 1 according to one embodiment of the present invention.
Figure 6A:
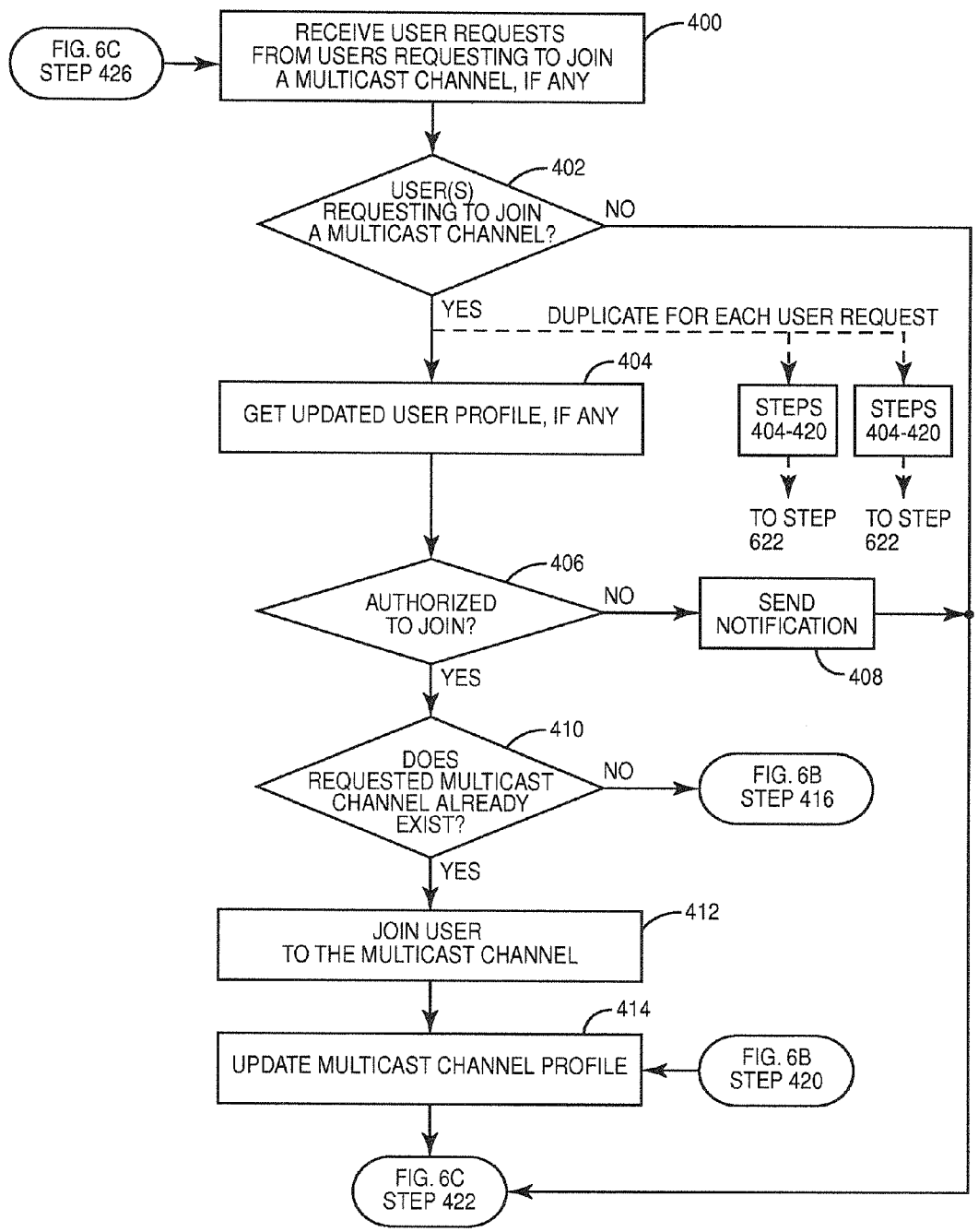
Figure 6B:
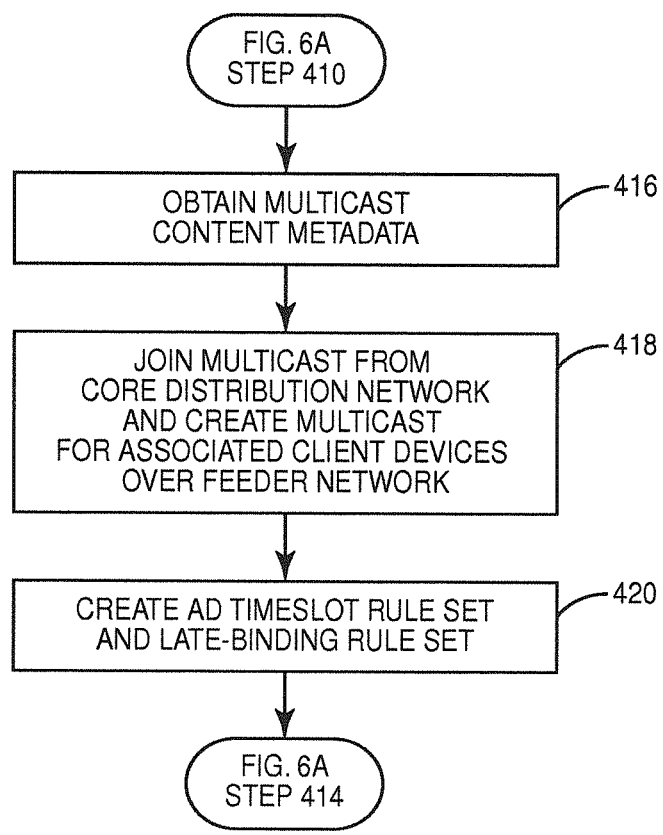
Figure 6C:
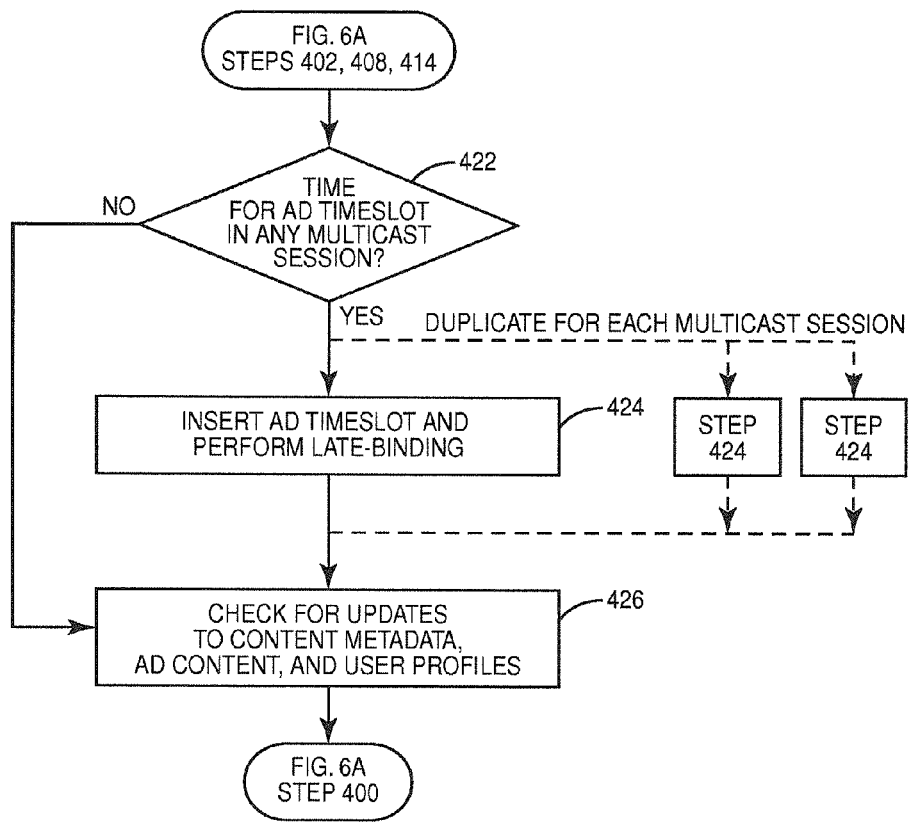
Figure 7:
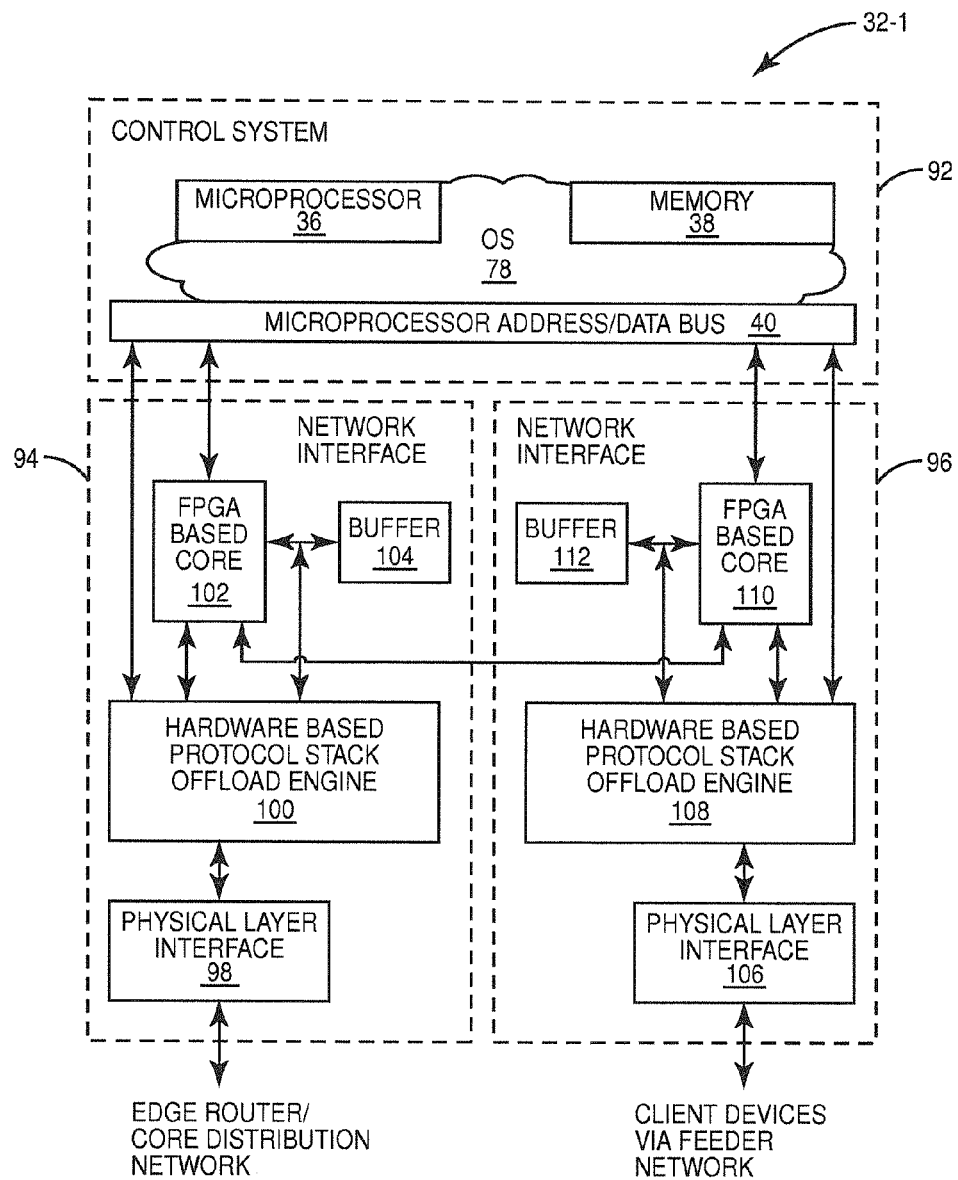
Figure 8:
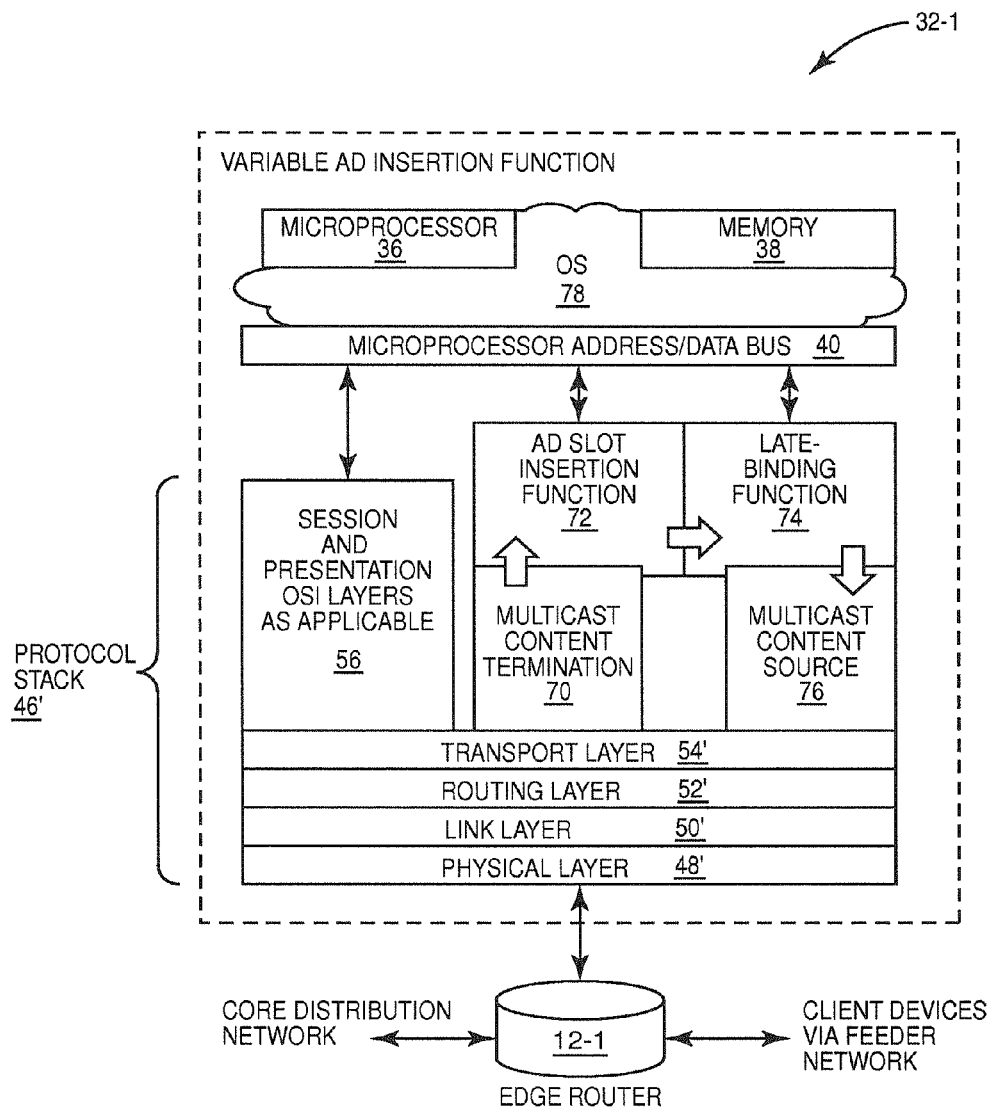

FIGS. 6A through 6C provide a flow chart illustrating the real-time operation of the ad insertion agent to dynamically control ad time according to one embodiment of the present invention;

FIG. 7 is a block diagram of an exemplary implementation of the variable ad insertion function of FIG. 2; and FIG. 8 illustrates an exemplary alternative embodiment of the variable ad insertion function of FIG. 2.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
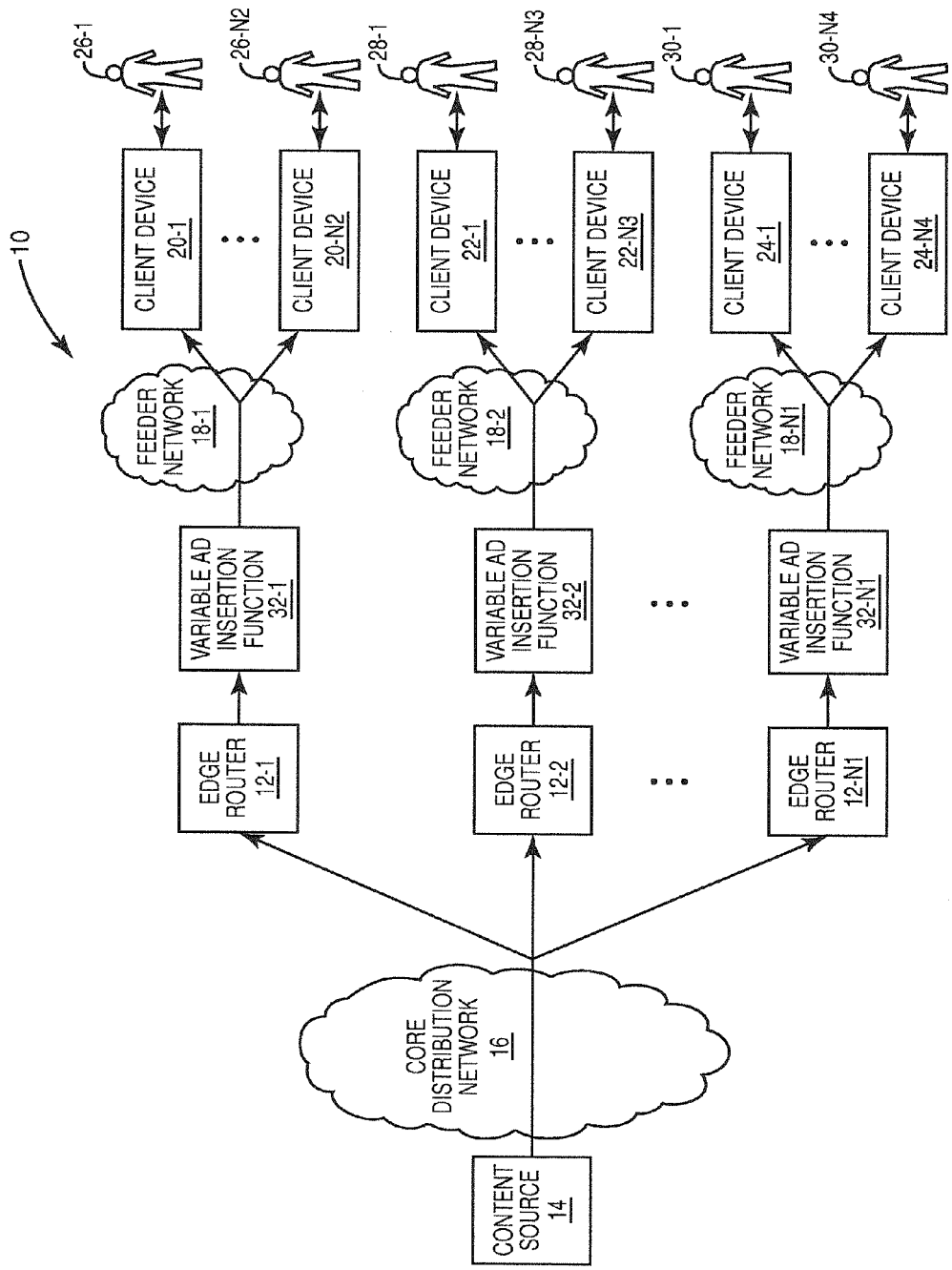
FIG. 1 illustrates a system for dynamically adjusting advertisement ("ad") time for multicast channels according to one embodiment of the present invention.

FIG. 1 illustrates an exemplary system 10 for dynamically adjusting advertisement ("ad") time for multicast channels according to one embodiment of the present invention. The system 10 includes edge routers 12-1 through 12-N1 connected to one or more content sources 14 via a core distribution network 16. The content source 14 generally operates to provide multicast content to the edge routers 12-1 through 12-N1 over the core distribution network 16. In one embodiment, the content source 14 multicasts streaming media content using Internet Protocol, Version 6 (IPv6) multicast streams in a manner that replicates broadband analog and digital time division multiplexing (TDM) media content delivery of legacy television distribution systems. Alternatively, IPv4 may be used in conjunction with protocols needed for multicast delivery. In one embodiment, only content being consumed by one or more of the client devices 20-1 through 20-N2, 22-1 through 22-N3, and 24-1 through 24-N4 is streamed by the content source 14 in order to conserve bandwidth for additional services such as Voice over IP (VoIP) services, Video on Demand (VoD) services, data services such as Internet connectivity, or the like. Alternatively, the content source 14 may stream all available content where the edge routers 12-1 through 12-N1 decide whether to continue the streams based on whether any of the client devices 20-1 through 20-N2, 22-1 through 22-N3, and 24-1 through 24-N4 are consuming the content. In one embodiment, the core distribution network 16 is a Wide Area Network (WAN) such as, for example, an optical Ethernet network providing a data rate of 10 Gigabit-per-second (Gbps) or greater.

The edge routers 12-1 through 12-N1 operate as entry points for multicast media content from the one or more content sources 14 into feeder networks 18-1 through 18-N1. In one embodiment, the feeder networks 18-1 through 18-N1 are IP based Hybrid Fiber Coax (HFC) Cable Television (CATV) networks operating according to Data Over Cable Service Interface Specifications (DOCSIS) 3.0. However, the present invention is not limited thereto. For example, the feeder networks 18-1 through 18-N1 may alternatively be Digital Subscriber Line (DSL) networks, wireless networks such as WiFi networks or WiMAX networks, fiber to the premise (FTTP) networks, or the like. Note that while in this embodiment each of the edge routers 12-1 through 12-N1 serves only one feeder network, the present invention is not limited thereto. Each of the edge routers 12-1 through 12-N1 may serve one or more feeder networks.

The feeder networks 18-1 through 18-N1 provide communication links to corresponding groups of client devices 20-1 through 20-N2, 22-1 through 22-N3, and 24-1 through 24-N4 having associated users 26-1 through 26-N2, 28-1 through 28-N3, and 30-1 through 30-N4. In one embodiment, the client devices 20-1 through 20-N2, 22-1 through 22-N3, and 24-1 through 24-N4 are set-top boxes (STBs). However, the present invention is not limited thereto. The client devices 20-1 through 20-N2, 22-1 through 22-N3, and 24-1 through 24-N4 may be any type of user device capable of directly or indirectly connecting to the feeder networks 18-1 through 18-N1 and having media playback capabilities. For example, the client devices 20-1 through 20-N2, 22-1 through 22-N3, and 24-1 through 24-N4 may alternatively be personal computers, video cards within personal computers, a mobile device such as a mobile telephone or portable media player, a gaming console, or the like.

Variable ad insertion functions 32-1 through 32-N1 operate to dynamically adjust ad time for multicast channels. In this embodiment, the variable ad insertion functions 32-1 through 32-N1 are illustrated as being between the edge routers 12-1 through 12-N1 and the feeder networks 18-1 through 18-N1. Note that, if needed for transmission over the feeder networks 18-1 through 18-N1 and reception from the feeder networks 18-1 through 18-N1, modems may be used to connect the variable ad insertion functions 32-1 through 32-N1 to the feeder networks 18-1 through 18-N1. For example, if the feeder networks 18-1 through 18-N1 are HFC networks, Quadrature Amplitude Modulation (QAM) modems may be used to interconnect the variable ad insertion functions 32-1 through 32-N1 to the feeder networks 18-1 through 18-N1. Also, while the variable ad insertion functions 32-1 through 32-N1 are illustrated as being separate from the edge routers 12-1 through 12-N1, the present invention is not limited thereto. The variable ad insertion functions 32-1 through 32-N1 may alternatively be implemented within the edge routers 12-1 through 12-N1. As another alternative, the variable ad insertion functions 32-1 through 32-N1 may be implemented in modems interconnecting the edge routers 12-1 through 12-N1 to the feeder networks 18-1 through 18-N1.

In operation, using the variable ad insertion function 32-1 as an example, the variable ad insertion function 32-1 receives a number of the multicast channels carrying multicast media content from the one or more content sources 14 via the core distribution network 16 and the edge router 12-1. Note that, in the preferred embodiment, the variable ad insertion function 32-1 only joins or receives multicast channels that are requested by the client devices 20-1 through 20-N2 in order to conserve bandwidth on the feeder network for additional services such as VoIP services, VoD services, data services such as Internet connectivity, or the like.

For each multicast channel, the variable ad insertion function 32-1 adjusts ad time in the multicast media content based on a number of the users 26-1 through 26-N2 viewing the multicast channel or predicted to view the multicast channel, a number of the client devices 20-1 through 20-N2 receiving the multicast channel or predicted to receive the multicast channel, or both. Users and/or client devices predicted to view the multicast channel may be identified based on, for example, historical information regarding multicast channels previously viewed, media content previously viewed, or the like, or any combination thereof. Note that in the preferred embodiment, the media content is video or television content. However, the media content may alternatively be, for example, audio content. As such, the ad time may be dynamically adjusted based on a number of the users 26-1 through 26-N2 consuming (i.e., listening, viewing, etc.) the multicast channel or predicted to consume the multicast channel, a number of the client devices 20-1 through 20-N2 receiving the multicast channel or predicted to receive the multicast channel, or both.

In one embodiment, the variable ad insertion function 32-1 dynamically adjusts ad time by dynamically adjusting a ratio of ad timeslots to total viewing time, a ratio of total ad time to total viewing time, a duration of the inserted ad timeslots, or any combination thereof. More specifically, in a preferred embodiment, the ratio of ad timeslots to total viewing time, the ratio of total ad time to total viewing time, and/or the duration of the inserted ad timeslots may be decreased as the number of the users 26-1 through 26-N2 viewing the multicast channel or predicted to view the multicast channel increases or the number of the client devices 20-1 through 20-N2 receiving the multicast channel increases. Note that in addition to or as an alternative to inserting ad timeslots, the variable ad insertion function 32-1 may adjust existing ad timeslots within the multicast media content.

While FIG. 1 illustrates only one user per client device, the present invention is not limited thereto. In one embodiment, more than one user may be associated with each of the client devices 20-1 through 20-N2, 22-1 through 22-N3, and 24-1 through 24-N4. Using the client device 20-1 as an example, the client device 20-1 may then detect or otherwise determine how many users are viewing a given multicast channel or predicted to view a given multicast channel and report that information to the variable ad insertion function 32-1. Each of the other client devices 20-2 through 20-N2 may do the same. The variable ad insertion function 32-1 may then control ad time in the multicast channel based on the total number of users viewing the given multicast channel at the client devices 20-1 through 20-N2.

In addition, in one embodiment, the variable ad insertion functions 32-1 through 32-N1 perform late-binding of ads to the ad timeslots inserted into the multicast content. Late-binding may be performed using any known technique. As an example, user profiles of the users viewing the multicast channel may be used to identify ads of interest to those users. The identified ads may then be placed within the inserted ad timeslots. A user profile of a user may include information such as demographic information describing the user, biographical information describing the user, historical information identifying content previously viewed by the user, preferences of the user manually entered by the user or ascertained from actions taken by the user such as content previously viewed by the user, or the like.

Alternatively, late-binding of ads to the inserted ad timeslots may be performed at the client devices 20-1 through 20-N2, 22-1 through 22-N3, and 24-1 through 24-N4 using any known technique. Again, as an example, user profiles may be used to identify ads of interest to the users viewing the multicast channels. As another alternative, late-binding may be performed by the variable ad insertion functions 32-1 through 32-N1, and one or more of the client devices 20-1 through 20-N2, 22-1 through 22-N3, and 24-1 through 24-N4 may then over-bind ads to one or more of the ad timeslots as desired.

The dynamic control of ad time in the multicast channels may serve as an incentive for users to request multicast channels already existing on the feeder network and, more specifically, multicast channels already existing on the feeder network and having a relatively large number of viewers in order to minimize ad time. By providing this incentive, bandwidth on the feeder network is conserved. As a result, bandwidth may be available to carry additional multicast channels without degradation of quality and/or to provide additional services such as VoD, VoIP, and data service (ex. Internet connectivity). Note that even though ad time is decreased as the number of viewers becomes large, advertisers also benefit in that their advertisements reach a large number of viewers.

FIG. 2 is a block diagram of the variable ad insertion function 32-1 according to one embodiment of the present invention. This discussion is equally applicable to the other ad insertion functions 32-2 through 32-N1. In this embodiment, the variable ad insertion function 32-1 includes a communication and ad insertion subsystem 34 interconnected to a microprocessor 36 and associated memory 38 via a bus 40. The communication and ad insertion subsystem 34 provides two ports. A first port 42 interconnects the variable ad insertion function 32-1 to the edge router 12-1 or alternatively the core distribution network 16 depending on the implementation. A second port 44 interconnects the variable ad insertion function 32-1 to the client devices 20-1 through 20-N2 via the feeder network 18-1. As discussed above, a modem may be used to interconnect the variable ad insertion function 32-1 to the feeder network 18-1. Alternatively, the functionality of the modem may be incorporated into the variable ad insertion function 32-1.

With respect to the first port 42, the communication and ad insertion subsystem 34 includes a protocol stack 46 including a physical layer 48, a link layer 50, a routing layer 52, a transport layer 54, and optionally one or more session and presentation OSI layers 56 as applicable. Likewise, with respect to the second port 44, the communication and ad insertion subsystem 34 includes a protocol stack 58 including a physical layer 60, a link layer 62, a routing layer 64, a transport layer 66, and optionally one or more session and presentation OSI layers 68 as applicable. In this embodiment, the routing layers 52 and 64 are interconnected to provide pass-through functionality for traffic not associated with multicast ad timeslot insertion. The transport layers 54 and 66 may be, for example, Transmission Control Protocol (TCP) or User Datagram Protocol (UDP) layers and operate to provide access to streaming content, metadata as described below, and general device communication.

In addition, the communication and ad insertion subsystem 34 includes a multicast content termination 70, an ad timeslot insertion function 72, optionally a late-binding function 74, and a multicast content source 76. In operation, the multicast content termination 70 receives one or more multicast channels carrying streaming multicast content from the corresponding content source(s) 14 via the core distribution network 16 and, in one embodiment, the edge router 12-1. For each multicast channel, the ad slot insertion function 72 operates to insert ad timeslots into the corresponding multicast content. Again, a ratio of ad timeslots to total viewing time, a ratio of total ad time to total viewing time, a duration of the inserted ad timeslots, or any combination thereof may be controlled based on the number of users from the users 26-1 through 26-N2 that are viewing the multicast channel or predicted to view the multicast channel or the number of client devices from the client devices 20-1 through 20-N2 receiving or predicted to receive the multicast channel.

Once the ad timeslots are created, the late-binding function 74, which again is optional, operates to insert ads into the ad timeslots created by the ad slot insertion function 72. Again, the ads inserted into the ad timeslots may be selected using any known or desired technique. The multicast content source 76 then sources multicast channels carrying the multicast content including the ad timeslots and, optionally, the ads selected for the ad timeslots to the client devices 20-1 through 20-N2. One or more client devices from the client devices 20-1 through 20-N2 that have joined the multicast channel then receive the multicast content and present or effect presentation of the multicast content including the ads inserted into the ad timeslots to the associated users.

The microprocessor 36 and associated memory 38 operate to host an operating system (OS) 78 of the variable ad insertion function 32-1. In one embodiment, the OS 78 hosts or otherwise provides an ad insertion agent that controls the multicast content termination 70, the ad slot insertion function 72, the late-binding function 74, and the multicast content source 76 according to the present invention. In another embodiment, the ad insertion agent is hosted by an external system, and the OS 78 interacts with the ad insertion agent to enable the ad insertion agent to control the multicast content termination 70, the ad slot insertion function 72, the late-binding function 74, and the multicast content source 76.

Figure 3:
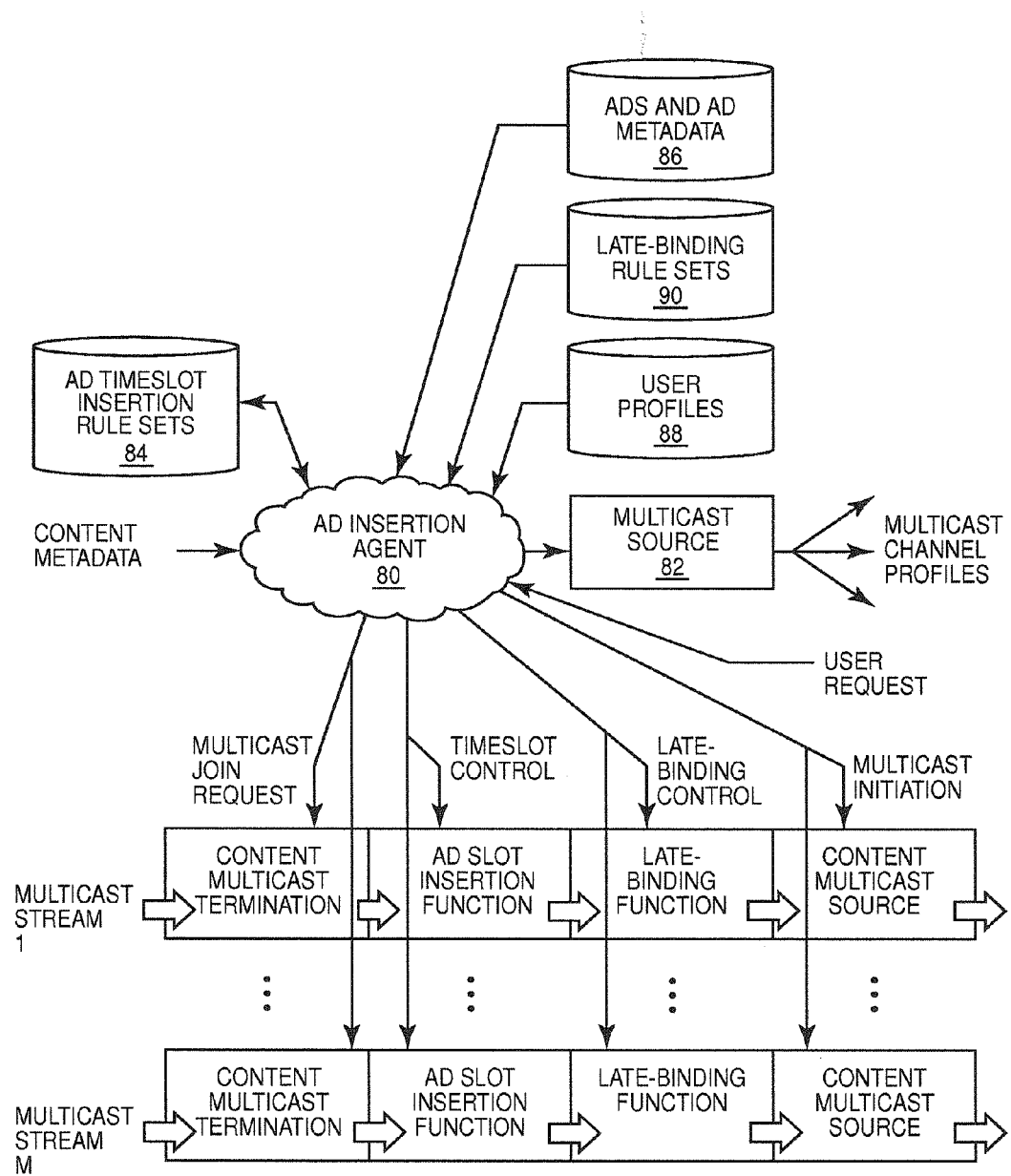
FIG. 3 is a block diagram illustrating an ad insertion agent of the variable ad insertion function of FIG. 2 according to one embodiment of the present invention.

FIG. 3 illustrates an ad insertion agent 80 and the operation thereof according to one embodiment of the present invention. The ad insertion agent 80 is preferably implemented in software. However, the present invention is not limited thereto. The ad insertion agent 80 may alternatively be implemented in hardware or a combination of hardware and software. For the following discussion, the ad insertion agent 80 is implemented in software and is hosted by the variable ad insertion function 32-1 of FIG. 2. However, the present invention is not limited thereto. The ad insertion agent 80 may alternatively be implemented on the edge router 12-1. As another alternative, the ad insertion agent 80 may be implemented on an associated server and may serve one or more of the variable ad insertion functions 32-1 through 32-N1.

In operation, the ad insertion agent 80 receives content metadata from the core distribution network 16 and more specifically from the one or more content sources 14. The content metadata includes information identifying and possibly describing content available from the content sources 14 via one or more multicast channels. For example, in one embodiment, the system 10 of FIG. 1 replicates a traditional analog or digital television delivery network. As such, the content metadata may include information identifying or describing the television content currently being provided on each of the multicast channels.

The ad insertion agent 80 multicasts multicast channel profiles to the associated client devices 20-1 through 20-N2 via a multicast source 82. In one embodiment, a separate multicast channel is used to multicast the multicast channel profiles. Alternatively, the multicast channel profiles may be delivered to the client devices 20-1 through 20-N2 in the multicast channels along with the multicast media content. Each multicast channel profile includes all or a portion of the content metadata for the corresponding multicast channel received from the content source 14. In addition to the content metadata, the multicast channel profile may include information such as a current ratio of ad timeslots to total viewing time (ex. 1 ad per 30 minutes) for the multicast channel, a ratio of total ad time to total viewing time (ex. 5 minutes of ads per 30 minutes) for the multicast channel, information identifying currently planned ad timeslots such as a start and stop time for each of a number of upcoming ad timeslots, a total number of users viewing or predicted to view the multicast channel, or the like, or any combination thereof. In addition, the multicast channel profile may include historical data such as statistics on the multicast channel for the last hour, day, week, month, or the like. In one embodiment, the multicast channel profiles may be provided in a manner similar to traditional Electronic Programming Guide (EPG) information. The multicast channel profiles may be updated when a new multicast channel is created in response to a request from one of the users 26-1 through 26-N2, when an existing multicast channel is terminated as a result of there being no more users viewing the multicast channel, when a new user begins viewing an existing multicast channel, when a user stops viewing an existing multicast channel, or the like.

All or a portion of the multicast channel profile information provided to the client devices 20-1 through 20-N2 may be encrypted to protect against unauthorized usage. For example, the ratio of ad timeslots to total viewing time may be encrypted using one key, currently planned ad timeslots may be encrypted using another key, and information describing the multicast media content may not be encrypted. Distributed applications on the client devices 20-1 through 20-N2, such as for example EPG applications, may be provided with the appropriate keys to use the multicast channel profiles in a pre-approved manner. In one embodiment, Open Cable Application Platform (OCAP) middleware may be used to implement the distributed application on the client devices 20-1 through 20-N2.

In operation, in one embodiment, the client devices 20-1 through 20-N2 present a menu such as an EPG to the users 26-1 through 26-N2 based on the multicast channel profiles. The menu may include, for example, a listing of all multicast channels available from the one or more content sources 14 or a select subset thereof for which the users 26-1 through 26-N2 are authorized to view. Using the user 26-1 as an example, the user 26-1 selects a desired multicast channel for playback at the client device 20-1. In response, the client device 20-1 provides a user request identifying the selected multicast channel to the ad insertion agent 80. If the selected multicast channel is already being multicast to the client devices 20-1 through 20-N2, the ad insertion agent 80 updates the multicast channel profile for the multicast channel. Also, if needed, the ad insertion agent 80 may provide information to the client device 20-1 needed to join or otherwise receive the multicast channel such as, for example, an IP address for the multicast channel, a password, a decryption key, or the like.

If the selected multicast channel is not already being multicast to the client devices 20-1 through 20-N2, the ad insertion agent 80 joins the multicast channel from the corresponding content source 14 over the core distribution network 16. If the selected multicast content is not already being multicast from the corresponding content source 14, the multicast channel is established. Once the ad insertion agent 80 has joined the multicast channel for the selected multicast content, the ad insertion agent 80 updates the multicast channel profile accordingly and begins transmitting the multicast channel to the client devices 20-1 through 20-N2 over the feeder network 18-1. Also, if needed, the ad insertion agent 80 may provide information to the client device 20-1 needed to join or otherwise receive the corresponding multicast channel such as, for example, an IP address for the multicast channel, a password, a decryption key, or the like.

In addition to processing user requests, the ad insertion agent 80 controls ad timeslot insertion and optionally late-binding of ads for each multicast channel provided to the client devices 20-1 through 20-N2. More specifically, as illustrated, for each of the one or more multicast channels received and re-multicast by the associated variable ad insertion function 32-1, the ad insertion agent 80 first controls the insertion of ad timeslots into the multicast channels based on one or more ad timeslot insertion rule sets 84. The ad timeslot insertion rule sets 84 may be stored locally, stored, remotely, embedded within the ad insertion agent 80, or the like. There may be one ad timeslot insertion rule set that is used for all multicast channels. Alternatively, separate rule sets may be provided for each multicast channel or for each of a number of groups of multicast channels. Still further, separate rule sets may be provided for specific content such as, for example, specific television programs; specific time periods such as, for example, primetime or Monday through Friday; content having specified metadata such as, for example, a desired actor or actress; or the like.

As an example, an ad timeslot insertion rule set 84 may include one or more rules for an associated multicast channel. The rules may be general rules applicable to all multicast content provided via the multicast channel or content specific rules that are applicable to specific content such as specific television programs provided via the multicast channel. Whether the rules are general rules or content specific rules, the rules for the multicast channel include one or more rules defining an algorithm for determining a ratio of ad timeslots to total viewing time, a ratio of total ad time to total viewing time, a duration of the inserted ad timeslots, or the like or any combination thereof based on the number of users viewing or predicted to view the multicast channel and/or the number of client devices receiving the multicast channel. For example, rules may be defined such that the ratio of ad timeslots to total viewing time is inversely proportional to the number of users viewing or predicted to view the multicast channel. Thus, by comparing the number of users currently viewing or predicted to view the multicast channel to the rules, the ad insertion agent 80 determines the ratio of ad timeslots to total viewing time for the multicast channel.

In addition, the rules may include a default minimum amount of ad time per program or per a specified amount of time, information identifying one or more fixed ad timeslots such as start and stop times for the fixed ad timeslots, information identifying times at which client devices may insert additional ad timeslots, information modifying the rules during identified periods of time, or the like. For example, the rules for a multicast channel on which the Super Bowl is to be multicast may be modified such that ad timeslot insertion and late-binding functionality is suspended during that time period in which the Super Bowl is originally aired. These additional rules are used by the ad insertion agent 80 in conjunction with the rules defining the algorithm described above to control the ad timeslot insertion function 72 (FIG. 2).

In addition, the ad insertion agent 80 may optionally perform late-binding of ads to the created ad slots. In this example, in order to perform late-binding, the ad insertion agent 80 stores or otherwise has access to a collection of ads and associated metadata 86, user profiles 88 of the users 26-1 through 26-N2, and one or more late-binding rule sets 90. The metadata associated with the ads may describe the ads, a target demographic or group of users for each of the ads, or the like, or any combination thereof. The user profiles 88 may include demographic information, biographical information, historical information, user preferences, or the like, or any combination thereof for each of the users 26-1 through 26-N2. The late-binding rule sets 90 define an algorithm for matching ads to groups of users based on the metadata associated with the ads and the user profiles 88 of the users 26-1 through 26-N2. For example, the late-biding rule sets 90 may provide that, for a given multicast channel, the ad insertion agent 80 is to aggregate the user profiles 88 of the users viewing or predicted to view the multicast channel to provide an aggregate user profile and then select targeted ads from the collection of ads and associated metadata 86 by comparing the aggregate user profile to the metadata associated with the ads.

Figure 4:
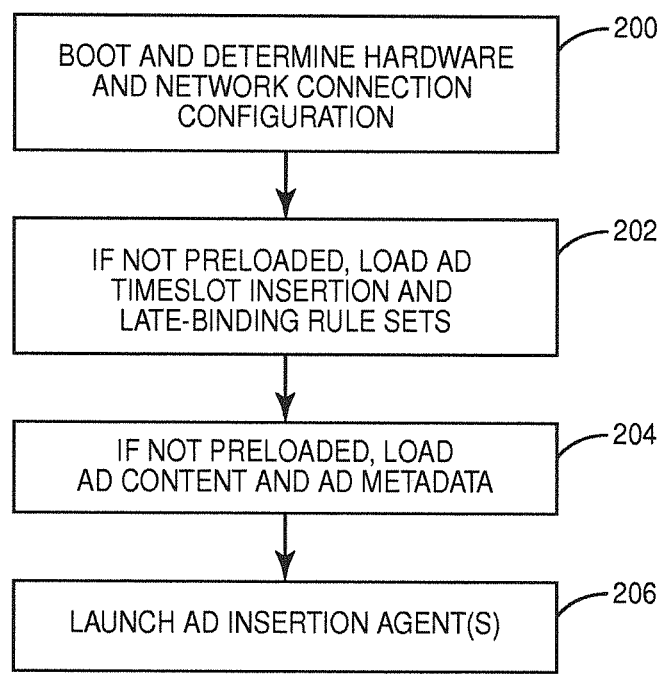
FIG. 4 is a flow chart illustrating the initialization of the variable ad insertion function of FIG. 2 according to one embodiment of the present invention.

FIG. 4 is a flow chart illustrating a process for initializing the variable ad insertion function 32-1 of FIG. 2 according to one embodiment of the present invention. In this embodiment, the ad insertion agent 80 is hosted by the variable ad insertion function 32-1. First, the variable ad insertion function 32-1 boots and determines hardware and network connection configuration (step 200). If the ad timeslot insertion rule sets 84 and the late-binding rule sets 90 are not preloaded, the ad timeslot insertion rule sets 84 and the late-binding rules sets 90 are loaded (step 202). The rule sets 84 and 90 may be loaded through one or more private or standardized Management Information Bases (MIBs) and an associated Network Management System (NMS) type master agent. Alternatively, the rule sets 84 and 90 may be downloaded within structured file formats over a network such as, for example, the core distribution network 16. Optionally, the rule sets 84 and 90 may be made available via network location pointers, such as iSCSI or other Storage Area Network (SAN) protocol. Likewise, if the ads and associated metadata 86 are not loaded, the ads and associated metadata 86 are loaded (step 204). The variable ad insertion function 32-1 then launches the ad insertion agent 80 (step 206). Note that if the variable ad insertion function 32-1 serves more than one feeder network 18-1, a separate ad insertion agent 80 may be launched for each feeder network 18-1.

Figure 5:
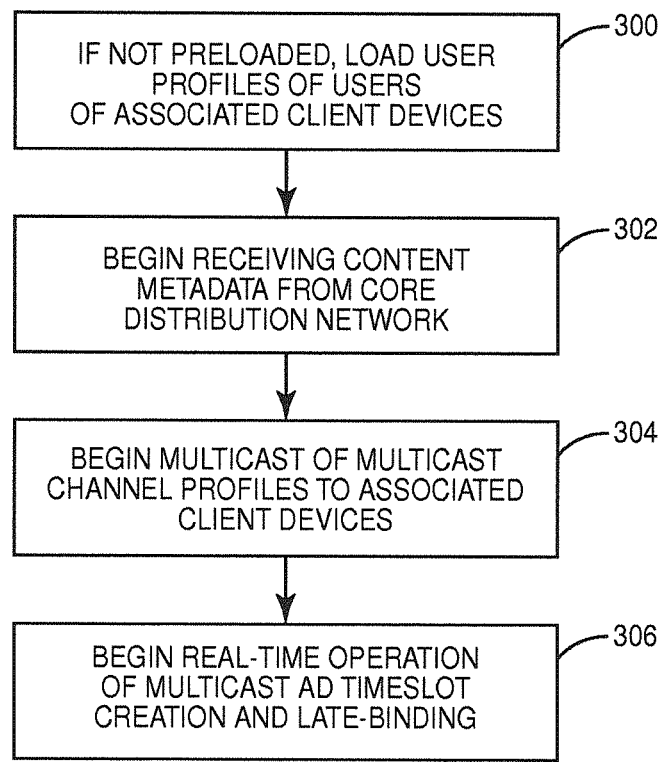
FIG. 5 is a flow chart illustrating the initialization of the ad insertion agent of FIG. 3 according to one embodiment of the present invention.

FIG. 5 is a flow chart illustrating a process for initializing the ad insertion agent 80 upon being launched by the variable ad insertion function 32-1 according to one embodiment of the present invention. First, if the user profiles 88 are not preloaded, the ad insertion agent 80 loads the user profiles 88 of the users 26-1 through 26-N2 of the associated client devices 20-1 through 20-N2 (step 300). The ad insertion agent 80 then begins receiving the content metadata from the core distribution network 16, and more specifically from the one or more content sources 14 via the core distribution network 16 (step 302). The ad insertion agent 80 also begins the multicast of the multicast channel profiles to the associated client devices 20-1 through 20-N2 (step 304). At this point, the ad insertion agent 80 begins a real-time operation of multicast ad timeslot insertion and, optionally, late-binding (step 306).

FIGS. 6A through 6C provide a flow chart illustrating the real-time operation of the ad insertion agent 80 to provide multicast ad timeslot insertion and, optionally, late-binding according to one embodiment of the present invention. Again, this discussion is focused on the exemplary embodiment of the ad insertion agent 80 where the ad insertion agent 80 is implemented within the variable ad insertion function 32-1 serving the client devices 20-1 through 20-N2. First, the variable ad insertion function 32-1 receives user requests from users requesting to join a multicast channel, if any (step 400) and determines whether there are any users requesting to join a multicast channel (step 402). If not, the process proceeds to step 422. If so, for each of the user requests, the following steps 404 through 420 are performed.

More specifically, for each user request to join a multicast channel, the ad insertion agent 80 gets, or otherwise identifies, an updated user profile for the associated user, if any (step 404). For this discussion assume that the user is the user 26-1. Thus, in other words, the ad insertion agent 80 may check for updates to the user profile of the user 26-1. The ad insertion agent 80 then determines whether the user 26-1 is authorized to join the requested multicast channel (step 406). In one embodiment, the user profile of the user 26-1 includes information identifying whether the user 26-1 is authorized to join the requested multicast channel. For example, the user profile of the user 26-1 may include a listing of multicast channels that the user 26-1 is or is not authorized to view. If the user 26-1 is not authorized, a notification may be sent to the client device 20-1, a remote authority, or both (step 408), and then the process proceeds to step 422.

If the user 26-1 is authorized to view the multicast channel, the ad insertion agent 80 determines whether the multicast channel already exists on the feeder network 18-1 (step 410). More specifically, there may be a large number of multicast channels distributed over the core distribution network 16. In order to conserve bandwidth on the feeder network 18-1, only those multicast channels that are being viewed or potentially predicted to be viewed by the users 26-1 through 26-N2 are actually multicast over the feeder network 18-1. As such, the ad insertion agent 80 determines whether the multicast channel requested by the user 26-1 is actually being multicast over the feeder network 18-1. If so, the ad insertion agent 80 enables the user 26-1, and more specifically the client device 20-1, to join the multicast channel (step 412). For example, if any information is needed by the client device 20-1 to join or otherwise receive the multicast channel, this information is provided to the client device 20-1. The multicast channel profile for the multicast channel is then updated to reflect the joining of the user 26-1 to the multicast channel (step 414). More specifically, in one embodiment, the user profile of the user 26-1 is combined with the user profiles of other users from the users 26-2 through 26-N2 that are viewing or potentially predicted to view the multicast channel to provide the aggregate user profile used for late-binding. In addition, the number of users viewing the multicast channel is updated. Other information in the multicast channel profile may also be updated as applicable. At this point, the process then proceeds to step 422.

Returning to step 410, if the requested multicast channel does not already exist on the feeder network 18-1, the ad insertion agent 80 obtains or otherwise identifies the content metadata for the requested multicast channel (FIG. 6B, step 416). The content metadata includes any information needed by the ad insertion agent 80 to join the corresponding multicast channel distributed over the core distribution network 16. The ad insertion agent 80 then joins the multicast for the requested multicast channel from the core distribution network 16 and creates or otherwise initiates the requested multicast channel on the feeder network 18-1 (step 418). Note that the ad insertion agent 80 may be required to spoof protocols between the client device 20-1 and the core network multicast such that the content source 14 and the client device 20-1 believe that they are on the same multicast session. The ad insertion agent 80 then creates or otherwise obtains an ad timeslot insertion rule set and a late-binding rule set for the multicast channel (step 420). The process then proceeds to step 414 (FIG. 6A) where the user 26-1 is joined to the multicast channel, and the multicast channel profile for the multicast channel is created or updated.

At this point, whether the process is proceeding from step 402, step 408, or step 414, the ad insertion agent 80 determines whether it is time to insert an ad timeslot into any multicast channel being multicast over the feeder network 18-1 to the client devices 20-1 through 20-N2 (step 422, FIG. 6C). More specifically, for each multicast channel, the ad insertion agent 80 determines a ratio of ad timeslots to total viewing time (ex. 1 ad timeslot per 30 minutes), a duration of the ad timeslots, a ratio of total ad time to total viewing time (ex. 5 minutes of ads per 30 minutes), or the like, or any combination thereof based on the corresponding rules and the number of users viewing or predicted to view the multicast channel or the number of client devices receiving or predicted to receive the multicast channel.

If the ad insertion agent 80 determines that it is time to insert an ad timeslot into one or more multicast channels, for each multicast channel where an ad timeslot is to be inserted, the ad insertion agent 80 controls the variable ad insertion function 32-1 to create or insert an ad timeslot into the multicast content being transmitted over the multicast channel and, optionally, perform late-binding (step 424). With respect to late-binding, the ad insertion agent 80 may identify an ad for an inserted ad timeslot by matching the aggregate user profile from the multicast channel profile to the metadata for the available ads. However, any known technique for selecting targeted ads may be used.

Whether or not an ad timeslot needs to be inserted, the ad insertion agent 80 checks for updates to the content metadata from the core distribution network 16, the ads and associated metadata 86, and the user profiles 88 (step 426). At this point, the process returns to step 400 (FIG. 6A) and is repeated.

FIG. 7 is a block diagram of one implementation of the variable ad insertion function 32-1 of FIG. 2 and more particularly the communication and ad insertion subsystem 34 of FIG. 2. In general, the variable ad insertion function 32-1 includes a control system 92, a network interface 94 providing a connection to the edge router 12-1 or the core distribution network 16 depending on the implementation, and a network interface 96 providing a connection to the client devices 20-1 through 20-N2 via the feeder network 18-1. In this embodiment, the control system 92 includes the microprocessor 36, the memory 38, and the bus 40, where the microprocessor 36 and memory 38 host the OS 78 of the device. Note that the memory 38 may include volatile memory such as Random Access Memory (RAM) and non-volatile memory such as a hard disk drive.

In this embodiment, the communication and ad insertion subsystem 34 (FIG. 2) is implemented by the network interfaces 94 and 96, which may be, for example, Network Interface Cards (NICs). As illustrated, the network interface 94 includes a physical layer interface 98, a hardware based protocol stack offload engine 100 (hereinafter referred to as offload engine 100), a Field Programmable Array (FPGA) based core 102, and a buffer 104. The offload engine 100 is a hardware implementation of the protocol stack 46 (FIG. 2). The FPGA based core 102 is a hardware implementation of one or more of the multicast content termination 70 (FIG. 2), the ad slot insertion function 72 (FIG. 2), and optionally the late-binding function 74 (FIG. 2). Note that the manner in which the multicast content termination 70, the ad slot insertion function 72, the late-binding function 74, and the multicast content source 76 (FIG. 2) are distributed among the network interfaces 94 and 96 may vary depending on the implementation. The FPGA based core 102 is exemplary. As an alternative, an Application Specific Integrated Circuit (ASIC) or similar hardware device may be used. The buffer 104 may be used by the FPGA based core 102 in order to buffer multicast content for ad timeslot insertion.

The network interface 96 includes a physical layer interface 106, a hardware based protocol stack offload engine 108 (hereinafter referred to as offload engine 108), a Field Programmable Array (FPGA) based core 110, and a buffer 112. The offload engine 108 is a hardware implementation of the protocol stack 58 (FIG. 2). The FPGA based core 110 is a hardware implementation of one or more of the ad slot insertion function 72 (FIG. 2), optionally the late-binding function 74 (FIG. 2), and the multicast content source 76 (FIG. 2). The FPGA based core 110 is exemplary. As an alternative, an ASIC or similar hardware device may be used. The buffer 112 may be used by the FPGA based core 110 in order to buffer multicast content for ad timeslot insertion. Note that, in this embodiment, the FPGA based cores 102 and 110 are interconnected. This may be used, for example, to provide a bypass for traffic not related to ad timeslot insertion.

FIG. 8 is similar to FIG. 2 and illustrates an alternative embodiment of the variable ad insertion function 32-1 where the edge router 12-1 is a three-port router. More specifically, the edge router 12-1 includes a first port interconnected to the core distribution network 16 (FIG. 1), a second port interconnected to the client devices 20-1 through 20-N2 (FIG. 1) via the feeder network, and a third port interconnected to the variable ad insertion function 32-1. Thus, in this embodiment, all traffic is routed through the edge router 12-1. For example, multicast content is directed to the variable ad insertion function 32-1 via the edge router 12-1. As discussed above, the variable ad insertion function 32-1 inserts ad timeslots into the multicast content and then multicasts the multicast content including the inserted ad timeslots to the client devices 20-1 through 20-N2 via the edge router 12-1.

Those skilled in the art will recognize improvements and modifications to the preferred embodiments of the present invention. All such improvements and modifications are considered within the scope of the concepts disclosed herein and the claims that follow.

What is claimed is:

1. A method comprising:
providing a multicast channel carrying media content to a plurality of client devices; and
dynamically adjusting, by a computing device comprising a processor, a duration of ad time with respect to a total duration of presentation time of the media content carried over the multicast channel based on at least one criterion selected from a group consisting of: a number of the plurality of client devices consuming the multicast channel and a number of the plurality of client devices predicted to consume the multicast channel, wherein the duration of ad time with respect to the total duration of presentation time decreases based on an increase in the number of the plurality of client devices and increases based on a decrease in the number of the plurality of client devices.

2. The method of claim 1 wherein dynamically adjusting the duration of ad time with respect to the total duration of presentation time of the media content comprises inserting ad timeslots into the media content carried over the multicast channel based on the at least one criterion.

3. The method of claim 1 wherein dynamically adjusting the duration of ad time with respect to the total duration of presentation time of the media content comprises adjusting ad time in the media content such that the duration of ad time to the duration of total presentation time is controlled based on the at least one criterion.

4. The method of claim 1 wherein dynamically adjusting the duration of ad time with respect to the total duration of presentation time of the media content comprises adjusting the duration of ad time in the media content such that a total duration of ad time over a specified duration of total presentation time is controlled based on the at least one criterion.

5. The method of claim 1 wherein dynamically adjusting the duration of ad time with respect to the total duration of presentation time of the media content comprises dynamically controlling the duration of ad time within the media content carried over the multicast channel based on the at least one criterion.

6. The method of claim 1 wherein the media content is television content.

7. The method of claim 1, further comprising:
providing a plurality of multicast channel profiles to a client device of the plurality of client devices for display on the client device, each of the plurality of multicast channel profiles corresponding to a different multicast channel of a plurality of multicast channels, and each of the plurality of multicast channel profiles comprising data indicating the duration of ad time to the total duration of presentation time of the media content associated with a corresponding multicast channel of the plurality of multicast channels.

8. A system comprising:
a communication and ad insertion subsystem adapted to provide a multicast channel carrying media content to a plurality of client devices; and
a control system adapted to control the communication and ad insertion subsystem to dynamically adjust a duration of ad time with respect to a total duration of presentation time of the media content carried over the multicast channel based on at least one criterion selected from a group consisting of: a number of the plurality of client devices consuming the multicast channel and a number of the plurality of client devices predicted to consume the multicast channel, wherein the duration of ad time with respect to the total duration presentation time decreases based on an increase in the number of the plurality of client devices and increases based on a decrease in the number of the plurality of client devices.

9. The system of claim 8 wherein in order to control the communication and ad insertion subsystem to dynamically adjust the duration of ad time with respect to the total duration of presentation time of the media content, the control system is further adapted to control the communication and ad insertion subsystem to insert ad timeslots into the media content carried over the multicast channel based on the at least one criterion.

10. The system of claim 9 wherein in order to control the communication and ad insertion subsystem to dynamically adjust the duration of ad time with respect to the total duration of presentation time of the media content, the control system is further adapted to control the communication and ad insertion subsystem to dynamically adjust the duration of ad time in the media content such that the duration of ad time with respect to the total duration of presentation time is controlled based on the at least one criterion.

11. A method of adjusting ad time in a multicast content stream on a feeder network, the content stream comprising a plurality of ad time slots, at least some of the ad time slots having a predetermined time duration, the method comprising:

determining, by a computing device comprising a processor, at each of a plurality of intervals over a period of time, a number of client devices that are consuming the content stream;
dynamically adjusting a predetermined time duration of a future ad time slot of the plurality of ad time slots wherein the predetermined time duration is reduced based on an increase in a number of client devices that are consuming the content stream between a first interval and a subsequent second interval, and the predetermined time duration is increased based on a decrease in the number of client devices that are consuming the content stream between the first interval and the subsequent second interval.

12. The method of claim 11, wherein the feeder network has a maximum bandwidth limit.

13. The method of claim 11, wherein the wherein the feeder network comprises one of a DOCSIS cable network, a digital subscriber line (DSL) network, and a fiber to the premise (FTTP) network.

14. The method of claim 11 wherein the feeder network comprises a wireless local area network.

15. The method of claim 11 wherein the feeder network comprises a wireless wide area network.

16. The method of claim 15 wherein the feeder network comprises a WiMax network.

17. The method of claim 11 wherein a total bandwidth usage of the feeder network is reduced with an increase in the number of client devices that consume the content stream.

18. A system comprising:
a communication and ad insertion subsystem adapted to provide a multicast channel carrying media content to a plurality of client devices over a feeder network, the media content comprising a plurality of ad time slots, at least some of the ad time slots having a predetermined time duration; and
a control system adapted to control the communication and ad insertion subsystem to:
determine at each of a plurality of intervals over a period of time, a number of client devices that are consuming a content stream; and
dynamically adjust the predetermined time duration of a future ad time slot of the plurality of ad time slots wherein the predetermined time duration is reduced based on an increase in the number of client devices that are consuming the content stream between a first interval and a subsequent second interval, and the predetermined time duration is increased based on a decrease in the number of client devices that are consuming the content stream between the first interval and the subsequent second interval.

19. The system of claim 18, wherein the wherein the feeder network comprises one of a DOCSIS cable network, a digital subscriber line (DSL) network, and a fiber network.

20. The system of claim 18, wherein the feeder network comprises a wireless wide area network.

* * * * *